United States Patent Office 3,390,136
Patented June 25, 1968

3,390,136
2,3 - BIS - (DIFLUORAMINO) - BUTANE - 1,4-DIISOCYANATE AND POLYURETHANES PREPARED THEREFROM
Ralph J. Leary, Cranford, Eugene L. Stogryn, Fords, and Perry A. Argabright, Cranford, N.J., assignors to Esso Research and Engineering Company a corporation of Delaware
No Drawing. Filed Nov. 20, 1961, Ser. No. 154,391
3 Claims. (Cl. 260—77.5)

ABSTRACT OF THE DISCLOSURE

The compound 2,3-bis-(difluoramino)-butane-1,4-diisocyanate is prepared by addition reaction of 2-butene-1,4-diisocyanate with $N_2F_4$ and is useful for producing high-energy polyurethanes.

This invention is concerned with a high-energy polyurethane binder containing a high proportion of $NF_2$ groups for use in solid rocket propellants, and is concerned with preparation of the binder from a suitable diisocyanate monomer condensed with a suitable diol monomer, both kinds of monomers containing oxidizing groups.

Polymeric binders containing oxidizing constituents which are compatible with high-energy propellant ingredients and that can be cast into a solid grain have been difficult to find. One reason for this difficulty is that some polymers have to be heated to a high melting or softening temperature for compounding and casting. At high temperatures, the $CNF_2$ groups tend to decompose. Another difficulty arises in forming or casting a condensation polymer which splits out gaseous decomposition products, e.g., $H_2O$ or HCl. Still another difficulty in obtaining a suitable binder is that of obtaining one which has suitable flexibility, toughness and adhesive properties. The major difficulty in forming polymeric binders containing $NF_2$ groups is the strong tendency of the $NF_2$ group to deactivate the catalyst and thereby inhibit polymerization.

A discovery enabling the present invention which overcomes difficulties mentioned is the synthesis of the $NF_2$-containing diisocyanate, which may be named 2,3-bis-(difluoramino)-butane-1,4-diisocyanate, which has the following formula:

$$OCNCH_2CH(NF_2)CH(NF_2)CH_2NCO$$

This diisocyanate satisfactorily reacts at mild temperatures with $NF_2$-containing glycols to form polyurethanes having a high proportion of $NF_2$ groups. This diisocyanate has been reacted satisfactorily with glycols containing high-energy groups such as $NF_2$ and $NO_2$. In preparing a castable binder, the polyurethane binder lends itself to crosslinking which is advantageous in formulation of solid propellant mixtures.

To synthesize the $NF_2$-containing diisocyanate, it has been found desirable to derive 2-butene-1,4-diisocyanate having the formula $OCNCH_2CH=CHCH_2NCO$ from 3-hexene-1,6-dioic acid chloride which is obtained from 1,3-butadiene as an inexpensive, high-purity starting material. The 1,3-butadiene is easily converted to 1,4-dichlorobutene-2 by chlorination and this dichlorobutene compound is converted readily to the dinitrile, 1,4-dicyanobutene-2. The dinitrile is hydrolyzed to 3-hexene-1,6-dioic acid which is reacted with $SOCl_2$ to form 3-hexane-1,6-dioic acid chloride. Said acid chloride is reacted with sodium azide ($NaN_3$) in an inert organic solvent immiscible with water, such as benzene, to form 3-hexene-1,6-dioic acid azide, which acid azide in an organic solvent free of water is decomposed thermally to form the 2-butene-1,4-diisocyanate which can then be recovered by separation of the solvent.

Considering the fact that the isocyanate group is a very reactive functional group and the difficulties of manufacturing high-purity diisocyanates suitable for making polyurethanes, it has been surprising that the bis $NF_2$ adduct of 2-butene-1,4-diisocyanate could be made in good yield and high degree of purity necessary for polyurethane synthesis. A preferred method of synthesizing the $NF_2$ adduct of this unsaturated diisocyanate is illustrated in the following example.

EXAMPLE 1

2-butene-1,4-diisocyanate adds a theoretical amount of $NF_2$ groups across the double bond when reacted at about 100° C. for 5 hours in $CCl_4$ under 400 to 450 p.s.i. of $N_2F_4$.

The temperature, time, solvent and pressure may be varied as, for example, in the use of a reaction temperature of 80° C. for a period of 15 hours. The carbon tetrachloride or similar kind of solvent may be evaporated with a stream of nitrogen to remove the solvent from the adduct. The adduct residue may then be distilled under vacuum, e.g., 0.001 mm. Hg absolute with a heating bath temperature of 75° C. The recovered reaction product, a water-white adduct, was analyzed as follows:

Theory for $C_6H_6O_2N_4F_4$: C, 29.75%; N, 23.16%; F, 31.4%. Found: C, 31.9%; N, 23.18%; F, 31.3%.

The infrared spectrum and nuclear magnetic resonance spectrum of the adduct showed it contained the terminal isocyanate groups and the $NF_2$ groups. The structure of the adduct, consistent with the elemental and structural analyses, is as follows:

$$OCN-CH_2-CH-CH-CH_2-NCO$$
$$\phantom{OCN-CH_2-}|\phantom{CH-}|$$
$$\phantom{OCN-CH_2-CH}NF_2\phantom{C}NF_2$$

It was found that care had to be taken to avoid excessive rise in the reaction temperature to avoid decomposition of the isocyanate functions. Thus the reaction temperature is within the range of 20° to 150° C., preferably 80° to 100° C.

The diisocyanate-$NF_2$ adduct can be copolymerized with $NF_2$ adducts of glycols or $NO_2$-containing glycols under mild conditions and the degree of polymerization can be controlled to form polyurethane prepolymer than can be satisfactorily blended with other high-energy ingredients, cast and hardened without significant loss of the eenrgy groups.

The general method of the copolymerization or condensation is illustrated by the following equation:

$$nOCN \cdot R' \cdot NCO + nHO \cdot R \cdot OH \rightarrow$$
$$H-[-O \cdot R \cdot OOC \cdot HN \cdot R'-]_n-NCO$$

wherein R represents a hydrocarbon group having attached energy groups such as $NF_2$ and $NO_2$, and R' represents the hydrocarbon group having attached $NF_2$ groups in the diisocyanate.

Equimolar proportions of the diisocyanate and of the glycol are mixed in an inert atmosphere and heated at about 40° to 50° C. for about 1 hour to obtain the copolymerization or condensation reaction. This reaction forms a viscous prepolymer, the property of which allows one to admix therewith other ingredients such as other solid fuel, solid or liquid oxidizer, liquid plasticizer and crosslinking agents. The prepolymer blend is then treated with a catalyst. Catalysts generally useful in the curing are salts of heavy metals, e.g., ferric chloride and ferric acetyl acetonate. Fortunately, the prepolymer can be cured at ambient temperatures, e.g., 20° to 25° C., for 24 to 48 hours or at a higher temperature, e.g., 50° C., for about 8 to 24 hours.

The resulting cured polymer does not shrink and clings tenaciously to the walls of the reaction vessel, thus indicating it has good case bonding properties.

The condensation of the diisocyanate-$NF_2$ adduct with an available energetic glycol was demonstrated using 2,2-dinitropropane diol. This condensation reaction is represented by the following equation:

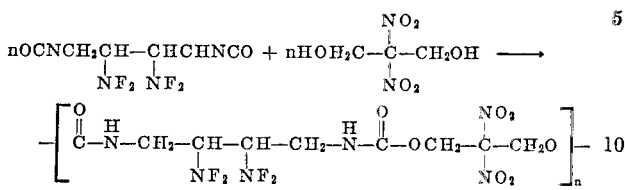

*Analyses.*—Found: C, 26.82%; N, 21.02%; F, 19.1%. Theory: C, 26.4%; N, 20.6%; F, 18.6%. Mol. weight, >1350. Inherent viscosity in methanol, 0.063.

A very high $NF_2$ content polyurethane containing one $NF_2$ group per two carbon atoms has been formed as described in the following example.

EXAMPLE 2

Using the general procedure described and a procedure such as given in more detail in Example 1, an equimolar mixture of 2,3-bis-(difluoramino)-butane-1,4-diisocyanate was reacted with bis ($NF_2$) ethylene glycol to obtain the high $NF_2$ content of polyurethane:

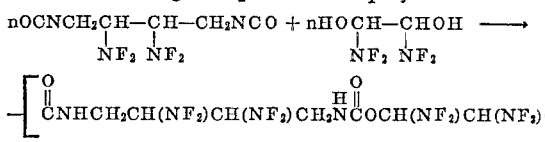

*Analyses.*—Found: N, 20.8%; F, 37.2%. Theory: N, 20.9%; F, 37.8%.

Another solid polyurethane containing $NF_2$ groups was formed using the $N_2F_4$ adduct of 2-butene-1,4-diol.

EXAMPLE 3

The $N_2F_4$ adduct of 2-butene-1,4-diisocyanate was reacted in an equimolar proportion with the $N_2F_4$ adduct of 2-butene-1,4-diol using the procedure that has been described. The $N_2F_4$ adduct of the diol has the following formula:

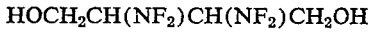

$$HOCH_2CH(NF_2)CH(NF_2)CH_2OH$$

*Analyses.*—Found: C, 27.87%; N, 19.69%; F, 36.8%. Theory: C, 27.70%; N, 19.38%; F, 35.1%. Mol. weight, 1,200. Inherent viscosity in methanol, 0.058.

EXAMPLE 4

The $N_2F_4$ adduct of 2-butene-1,4-diisocyanate was reacted in an equimolar proportion with the di-$N_2F_4$ adduct of 3,4-dihydroxy-1,5-hexadiene under the conditions outlined in Example 1 to give a tacky solid polyurethane.

*Analyses.*—Found: N, 19.1%; F, 41,9%. Theory: N, 19.9%; F, 40.5%. Mol. weight, >835. Inherent viscosity in methanol, 0.06.

The recurring unit characterizing the polyurethane product contains the constituents of the diisocyanate and of the diol in the recurring units.

The $NF_2$-containing polyurethanes which have been prepared show a good degree of impact stability, in the range of 20 to about 50 kg. in.

The energetic ($NF_2$-containing) polyurethane prepolymers of 2,3-bis-($NF_2$)-butane-1,4-diisocyanate have a suitable consistency and compatibility with energetic fuels and oxidizers, e.g. powdered metals, boron, lithium, beryllium, magnesium, aluminum and hydrides, hydrazinium nitroformate, hexanitroethane, tetrakis-($NF_2$)-tetrahydrofuran, and tetrakis-($NF_2$)-butane. This is an important qualification in formulating solid propellants of suitably blended ingredients that confer on the composited propellants desired high-energy values in terms of specific impulse and uniform combustion.

Satisfactory castable blends have been made with the described ($NF_2$)-containing polyurethane prepolymers formed to have molecular weights in the range of about 835 to 1350, as in the following formulation:

| Ingredient: | Wt. percent |
|---|---|
| Tetrakis-($NF_2$)-tetrahydrofuran | 50 |
| Hydrazinium nitroformate | 30–35 |
| Boron powder | 0–5 |
| Polyurethane binder (Example 1) | 15 |

Isp=280.

The blending of the ingredients was conducted safely and without noticeable decomposition or loss of materials. The blend described was cast and cured. The cast and cured composite showed tenacious adhesion to rocket motor wall materials.

The invention described is claimed as follows:

1. 2,3-bis-(difluoramino)-butane-1,4-diisocyanate.

2. A process for preparing 2,3-bis-(difluoramino)-butane-1,4-diisocyanate comprising reacting 2-butene-1,4-diisocyanate with $N_2F_4$ under pressure at a temperature of about 20° C. to 150° C.

3. The polyurethane product having a molecular weight between 835 and 1350 formed by reacting 2,3-bis-(difluoramino)-butane-1,4-diisocyanate with 2,2-dinitropropane-1,3-diol in about equal proportions in an inert atmosphere for a period of about 1 hour at 40° C. to 50° C.

References Cited

Polymer Previews, vol. 3, Issue 6, June 1967, p. 298 cited as being of interest.

American Chemical Society, "Abstracts of Papers," Aug. 22, 1966, Items 4 and 18 in Section K cited as being of interest.

Chemical Abstracts, vol. 65, p. 10482 (1966).

DONALD E. CZAJA, *Primary Examiner.*

R. L. CAMPBELL, *Examiner.*

J. W. WHISLER, F. McKELVEY, *Assistant Examiners.*